United States Patent
Fujisawa et al.

(10) Patent No.: US 9,403,982 B2
(45) Date of Patent: *Aug. 2, 2016

(54) CURABLE SILICONE COMPOSITION AND CURED PRODUCT THEREOF

(71) Applicant: DOW CORNING TORAY CO., LTD., Tokyo (JP)

(72) Inventors: Toyohiko Fujisawa, Chiba (JP); Kazusato Shibata, Chiba (JP)

(73) Assignee: DOW CORNING CORPORATION, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/425,530

(22) PCT Filed: Sep. 5, 2013

(86) PCT No.: PCT/JP2013/074605
§ 371 (c)(1),
(2) Date: Mar. 3, 2015

(87) PCT Pub. No.: WO2014/038723
PCT Pub. Date: Mar. 13, 2014

(65) Prior Publication Data
US 2015/0210853 A1    Jul. 30, 2015

(30) Foreign Application Priority Data
Sep. 7, 2012 (JP) .................................. 2012-197957

(51) Int. Cl.
*C08K 3/36* (2006.01)
*C08L 83/04* (2006.01)
*C08G 77/12* (2006.01)
*C08G 77/20* (2006.01)

(52) U.S. Cl.
CPC ................ *C08L 83/04* (2013.01); *C08G 77/12* (2013.01); *C08G 77/20* (2013.01); *C08K 3/36* (2013.01)

(58) Field of Classification Search
CPC combination set(s) only.
See application file for complete search history.

(56) References Cited

U.S. PATENT DOCUMENTS

| 3,862,065 | A | * | 1/1975 | Yokokawa | C08K 7/14 264/331.11 |
| 3,948,848 | A | | 4/1976 | Mink | |
| 4,076,684 | A | | 2/1978 | Wohlfarth et al. | |
| 4,293,479 | A | * | 10/1981 | Hanada | C08K 7/18 523/443 |
| 2007/0166555 | A1 | | 7/2007 | Ikeno et al. | |
| 2007/0219312 | A1 | * | 9/2007 | David | C09J 183/04 524/588 |
| 2013/0178571 | A1 | * | 7/2013 | Ogawa | C08L 83/04 524/500 |
| 2014/0377570 | A1 | * | 12/2014 | Hirai | C08G 77/20 428/447 |

FOREIGN PATENT DOCUMENTS

| EP | 2612887 A1 | 7/2013 |
| JP | 2006-335857 A | 12/2006 |
| JP | 2007-039483 A | 2/2007 |
| WO | WO2012029538 A1 | 3/2012 |
| WO | 2013/039265 A1 | 3/2013 |

OTHER PUBLICATIONS

PCT/JP2013/074605 International Search Report dated Oct. 17, 2013, 4 pages.

English language abstract and machine assisted English translation for JP2006-335857 extracted from http://www4.ipdl.inpit.go.jp/database on Mar. 3, 2015, 11 pages.

English language abstract and machine assisted English translation for JP2007-039483 extracted from http://www4.ipdl.inpit.go.jp/database on Mar. 3, 2015, 12 pages.

* cited by examiner

*Primary Examiner* — Margaret Moore
(74) *Attorney, Agent, or Firm* — Dow Corning Corporation

(57) ABSTRACT

A curable silicone composition comprises at least (A) an organopolysiloxane having at least two alkenyl groups in a molecule, (B) an organopolysiloxane having at least two silicon-bonded hydrogen atoms in a molecule, (C) a hydrosilylation reaction catalyst, (D) an approximately spherical silica fine powder having an average particle diameter of 50 μm or less and (E) glass fibers having an average fiber length of 1,000 μm or less and an average fiber diameter of 30 μm or less. A cured product produced by curing the curable silicone composition is also disclosed.

20 Claims, No Drawings

CURABLE SILICONE COMPOSITION AND CURED PRODUCT THEREOF

CROSS-REFERENCE TO RELATED APPLICATIONS

This application is the National Stage of International Patent Application No. PCT/JP2013/074605, filed on Sep. 5, 2013, which claims priority to and all advantages of Japanese Patent Application No. 2012-197957, filed on Sep. 7, 2012, the content of which is hereby incorporated by reference.

TECHNICAL FIELD

The present invention relates to a curable silicone composition and a cured product thereof.

BACKGROUND ART

Curable silicone compositions that are cured by hydrosilylation reactions exhibit excellent heat resistance, cold resistance, electrical insulating properties and so on, and are therefore widely used in electrical and electronic applications. However, because cured products obtained by curing such curable silicone compositions generally exhibit high coefficients of thermal expansion, in cases where such cured products are integrated with other members, peeling occurs at the interface with the cured product as a result of temperature changes and cracks appear in the cured product upon curing. Blending a large quantity of an inorganic filler in a curable silicone composition is a well-known means for reducing the coefficient of thermal expansion of a cured product, but the viscosity of the obtained composition significantly increases, workability deteriorates, and the obtained cured product lacks flexibility.

Examples of a curable silicone composition that reduces the coefficient of thermal expansion of a cured product include following. Patent document 1 discloses a curable silicone composition comprising: an alkenyl group-containing organopolysiloxane including a straight chain organopolysiloxane, which contains 2 or more alkenyl groups among silicon-bonded organic groups in the molecule and which may comprise up to 30% of phenyl groups, with the remainder being methyl groups, and a branched chain organopolysiloxane, which contains $SiO_{4/2}$ units and $R(CH_3)_2SiO_{1/2}$ units (in the formulae, R represents an alkenyl group or a methyl group) and which contains 3 or more silicon-bonded alkenyl groups in a molecule; an alkylhydrogenpolysiloxane which comprises $SiO_{4/2}$ units and $R'(CH_3)_2SiO_{1/2}$ units (in the formulae, R' represents a hydrogen atom or an alkyl group) and which contains 3 or more silicon-bonded hydrogen atoms in a molecule; and a platinum group metal compound. Patent document 2 discloses a curable silicone composition: comprising an alkenyl group-containing organopolysiloxane including a phenyl group-containing organopolysiloxane that contains an average of 3 or more alkenyl groups in a molecule, and a straight chain organopolysiloxane which contains 2 or more alkenyl groups among silicon-bonded organic groups in the molecule, and which may comprise 20 to 60% of phenyl groups, with the remainder being methyl groups; an alkylhydrogenpolysiloxane, which comprises $SiO_{4/2}$ units and $R''(CH_3)_2SiO_{1/2}$ units (in the formulae, R'' represents a hydrogen atom or a methyl group) and which contains 3 or more silicon-bonded hydrogen atoms in a molecule; and a platinum group metal compound. Patent document 3 discloses a curable silicone composition at least comprising: at least one type of organopolysiloxane containing at least two unsaturated aliphatic hydrocarbon groups in a molecule; at least one type of organohydrogenpolysiloxane containing at least two silicon-bonded hydrogen atoms in a molecule; a hydrosilylation catalyst; and inorganic particles which have a major axis to minor axis ratio of 1 to 1.5 and in which the proportion of particles having a diameter of 50 μm or greater is 5 wt. % or less of the total quantity of particles.

However, even these curable silicone compositions cannot adequately reduce the coefficient of thermal expansion of a cured product and cannot adequately inhibit the occurrence of cracking upon curing.

PATENT DOCUMENTS

Patent Document 1: Japanese Unexamined Patent Application Publication No. 2006-335857
Patent Document 2: Japanese Unexamined Patent Application Publication No. 2007-039483
Patent Document 3: WO2012/029538 pamphlet

SUMMARY OF INVENTION

Technical Problem

An objective of the present invention is to provide a curable silicone composition which hardly cracks upon curing and which, when cured, forms a cured product having a low coefficient of thermal expansion, and a cured product having a low coefficient of thermal expansion.

Solution to Problem

The curable silicone composition of the present invention comprises:
(A) an organopolysiloxane having at least two alkenyl groups in a molecule;
(B) an organopolysiloxane having at least two silicon-bonded hydrogen atoms in a molecule, included at a quantity whereby an amount of silicon-bonded hydrogen atoms in the component (B) is from 0.5 to 10 moles per 1 mole of the alkenyl groups in the component (A);
(C) a catalytic quantity of a hydrosilylation reaction catalyst;
(D) an approximately spherical silica fine powder having an average particle diameter of 50 μm or less, included at a quantity of 200 parts by mass or more relative to a total of 100 parts by mass of the component (A) and the component (B); and
(E) glass fibers having an average fiber length of 1,000 μm or less and an average fiber diameter of 30 μm or less, included at a quantity of 25 parts by mass or more relative to a total of 100 parts by mass of the component (A) and the component (B);
wherein the total content of the component (D) and the component (E) is 900 parts by mass or less relative to the total of 100 parts by mass of the component (A) and the component (B).

The above-mentioned component (A) is preferably an organopolysiloxane comprising: 30 to 100 mass % of ($A_1$) an organopolysiloxane comprising a siloxane block represented by the general formula:

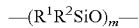

(wherein, $R^1$ is an alkyl group having 1 to 6 carbon atoms or a phenyl group, $R^2$ is an alkenyl group having 2 to 10 carbon atoms, and m is a positive number in a range of 3 to 50); and 0 to 70 mass % of ($A_2$) an organopolysiloxane which does not have the above-mentioned siloxane block and which contains at least two alkenyl groups in a molecule.

In addition, the above-mentioned component (B) is preferably an organopolysiloxane comprising a siloxane block represented by the general formula:

—($R^3$HSiO)$_n$—

(wherein, $R^3$ is an alkyl group having 1 to 6 carbon atoms or a phenyl group, and n is a positive number in a range of 3 to 100).

In addition, the component (D) is preferably a fused silica fine powder and the component (E) is preferably milled glass fibers.

Furthermore, the present composition preferably contains (F) an adhesion promoter. Also, the present composition preferably contains (G) non-silicone monomer having two or more of polymerizable double bond, more preferably contains triallylisocyanurate.

Moreover, the cured product of the present invention is formed by curing the aforementioned curable silicone composition.

Advantageous Effects of Invention

The curable silicone composition of the present invention is characterized by hardly cracking upon curing and, when cured, forming a cured product having a low coefficient of thermal expansion. In addition, the cured product of the present invention is characterized by having a low coefficient of thermal expansion.

DESCRIPTION OF EMBODIMENTS

First, the curable silicone composition of the present invention will be explained in detail. Component (A) is an organopolysiloxane having at least two alkenyl groups in a molecule. Examples of the alkenyl groups in the component (A) include alkenyl groups having 2 to 10 carbon atoms, such as vinyl groups, allyl groups, butenyl groups, pentenyl groups and hexenyl groups. In addition, examples of groups bonding to silicon atoms other than alkenyl groups in the component (A) include alkyl groups having 1 to 12 carbon atoms, such as methyl groups, ethyl groups, propyl groups, butyl groups, pentyl groups, hexyl groups, heptyl groups, cyclopentyl groups, cyclohexyl groups and cycloheptyl groups; aryl groups having 6 to 12 carbon atoms, such as phenyl groups, tolyl groups and xylyl groups; aralkyl groups having 7 to 12 carbon atoms, such as benzyl groups and phenethyl groups; and halogen-substituted alkyl groups having 1 to 12 carbon atoms, such as 3-chloropropyl groups and 3,3,3-trifluoropropyl groups. The molecular structure of the component (A) is not particularly limited and may be, for example, straight chain, straight chain having some branches, branched chain, or cyclic. The viscosity at 25° C. of the component (A) is not particularly limited, but it is preferable for the viscosity obtained in accordance with JIS K7117-2 using a rotational viscometer to be 100,000 mPa·s or lower and for the (kinetic) viscosity obtained in accordance with JIS Z8803 using a capillary tube viscometer to be 1 mm$^2$/s or higher.

In particular, in order to be able to reduce the coefficient of thermal expansion of a cured product obtained by curing the present composition, it is preferable for the component (A) to be an organopolysiloxane comprising 30 to 100 mass % of ($A_1$) an organopolysiloxane having at least a siloxane block represented by the general formula:

—($R^1R^2$SiO)$_m$—

(in the formula, $R^1$ is an alkyl group having 1 to 6 carbon atoms or a phenyl group, $R^2$ is an alkenyl group having 2 to 10 carbon atoms, and m is a positive number in the range of 3 to 50) and 0 to 70 mass % of ($A_2$) an organopolysiloxane which does not have the above-mentioned siloxane block and which contains at least two alkenyl groups in a molecule).

In the formula, $R^1$ is an alkyl group having 1 to 6 carbon atoms or a phenyl group. Examples of the alkyl group in $R^1$ include methyl groups, ethyl groups, propyl groups, butyl groups, pentyl groups, hexyl groups, heptyl groups, cyclopentyl groups and cyclohexyl groups. In the formula, $R^2$ is an alkenyl group having 2 to 10 carbon atoms, examples of which include vinyl groups, allyl groups, butenyl groups, pentenyl groups and hexenyl groups. In the formula, "m" is a positive number in a range from 3 to 50, and preferably is a positive number in a range from 3 to 30. This is because if the value of m is greater than or equal to the lower limit of the above-mentioned range, the coefficient of thermal expansion of the obtained cured product is significantly reduced, and if the value of m is lower than or equal to the upper limit of the above-mentioned range, the mechanical strength of the obtained cured product is improved.

Component ($A_1$) can be a cyclic organopolysiloxane comprising only the above-mentioned siloxane block or an organopolysiloxane which comprises only the above-mentioned siloxane block and in which both molecular terminals are capped. Examples of groups at the molecular chain terminals include hydroxyl groups; alkoxy groups such as methoxy groups, ethoxy groups and propoxy groups; and organosiloxy groups such as trimethylsiloxy groups, dimethylvinylsiloxy groups, dimethylphenylsiloxy groups and methylphenylvinylsiloxy groups. In addition, another example of the component ($A_1$) is a block copolymer in which the above-mentioned siloxane block (X) is linked to another siloxane block (Y). Examples of such block copolymers include XY copolymers in which one block each of X and Y are linked, XYX copolymers in which X is linked to both terminals of Y, and (XY)$_z$ copolymers in which a number (z) of repetitions of X and Y are alternately linked. This siloxane block (Y) can be a siloxane block comprising a siloxane represented by the general formula:

—($R^1_2$SiO)—

(in the formula, $R^1$ is an alkyl group having 1 to 6 carbon atoms or a phenyl group) or repetitions thereof. Moreover, examples of groups at the molecular chain terminals of the block copolymer include hydroxyl groups, alkoxy groups similar to those mentioned above and organosiloxy groups similar to those mentioned above.

In general, organopolysiloxanes are prepared by polymerizing a cyclic diorganosiloxane by means of a reequilibration reaction in the presence of a base catalyst or acid catalyst, but if using such a method, it is difficult to prepare a block copolymer in which the above-mentioned siloxane blocks are retained. Therefore, an example of a method for preparing a block copolymer such as that mentioned above is a method in which a polysiloxane having the above-mentioned siloxane block (X) and a siloxane or polysiloxane having another siloxane block (Y) are subjected to a condensation reaction.

Examples of organopolysiloxanes of the component ($A_1$) include copolymers of dimethylsiloxane and methylvinylsiloxane capped at both molecular terminals with trimethylsiloxy groups, methylvinylpolysiloxanes capped at both molecular terminals with trimethylsiloxy groups, dimethylsiloxane.methylvinylsiloxane.methylphenylsiloxane copolymers capped at both molecular terminals with trimethylsiloxy groups, methylvinylpolysiloxanes capped at both molecular terminals with dimethylvinylsiloxy groups, copolymers of dimethylsiloxane and methylvinylsiloxane capped at both molecular terminals with dimethylvinylsiloxy groups, dimethylsiloxane.methylvinylsiloxane.methylphenylsiloxane copolymers capped at both molecular terminals with dimethylvinylsiloxy groups, and mixtures of two or more of these organopolysiloxanes.

In addition, examples of organopolysiloxane of component ($A_2$) include straight chain organopolysiloxanes, such as dimethylpolysiloxanes capped at both molecular terminals with dimethylvinylsiloxy groups, dimethylsiloxane-methylvinylsiloxane random copolymers capped at both molecular terminals with dimethylvinylsiloxy groups, dimethylsiloxane-methylphenylsiloxane copolymers capped at both molecular terminals with dimethylvinylsiloxy groups, dimethylsiloxane-methylvinylsiloxane random copolymers capped at both molecular terminals with trimethylsiloxy groups, organopolysiloxane copolymers comprising siloxane units represented by the formula $R^1{}_3SiO_{1/2}$, siloxane units represented by the formula $R^1{}_2R^2SiO_{1/2}$ and siloxane units represented by the formula $SiO_{4/2}$, organopolysiloxane copolymers comprising siloxane units represented by $R^1{}_2R^2SiO_{1/2}$ and siloxane units represented by the formula $SiO_{4/2}$, organopolysiloxane copolymers comprising siloxane units represented by the formula $R^1R^2SiO_{2/2}$ and siloxane units represented by the formula $R^1SiO_{3/2}$ or siloxane units represented by the formula $R^2SiO_{3/2}$, and mixtures of two or more of these organopolysiloxanes. Moreover, $R^1$ in the formulae is an alkyl group having 1 to 6 carbon atoms or a phenyl group. Examples of the alkyl group of $R^1$ are the same as those previously mentioned. In addition, examples of the alkenyl groups having 2 to 10 carbon atoms of $R^2$ are the same as those previously mentioned. In addition, in these organopolysiloxanes, extremely small quantities of hydroxyl groups, alkoxy groups and the like may be bonded to silicon atoms in the molecule.

In the component (A), the content of the above-mentioned component ($A_1$) is not particularly limited, but is preferably from 30 to 100 mass %, more preferably from 30 to 90 mass %, and particularly preferably from 30 to 80 mass %. This is because if the content of the component ($A_1$) is greater than or equal to the lower limit of the above-mentioned range, the coefficient of thermal expansion of the obtained cured product is significantly reduced, and if the content of the component ($A_1$) is lower than or equal to the upper limit of the above-mentioned range, the mechanical strength of the obtained cured product is improved.

Component (B) is a curing agent of the present composition and is an organopolysiloxane having at least two silicon-bonded hydrogen atoms in the molecule. Examples of groups bonding to silicon atoms other than hydrogen atoms in the component (B) include alkyl groups having 1 to 12 carbon atoms, such as methyl groups, ethyl groups, propyl groups, butyl groups, pentyl groups, hexyl groups, heptyl groups, cyclopentyl groups, cyclohexyl groups and cycloheptyl groups; aryl groups having 6 to 12 carbon atoms, such as phenyl groups, tolyl groups and xylyl groups; aralkyl groups having 7 to 12 carbon atoms, such as benzyl groups and phenethyl groups; and halogen-substituted alkyl groups having 1 to 12 carbon atoms, such as 3-chloropropyl groups and 3,3,3-trifluoropropyl groups. The molecular structure of the component (B) is not particularly limited and may be, for example, straight chain, straight chain having some branches, branched chain, or cyclic. The viscosity at 25° C. of the component (B) is not particularly limited, but it is preferable for the viscosity obtained in accordance with JIS K7117-2 using a rotational viscometer to be 100,000 mPa·s or lower and for the (kinetic) viscosity obtained in accordance with JIS Z8803 using a capillary tube viscometer to be 1 mm²/s or higher.

In particular, in order to be able to reduce the coefficient of thermal expansion of a cured product obtained by curing the present composition, it is preferable for the component (B) to be an organopolysiloxane having at least a siloxane block represented by the general formula:

(in the formula, $R^3$ is an alkyl group having 1 to 6 carbon atoms or a phenyl group, and n is a positive number in the range of 3 to 100).

In the formula, $R^3$ is an alkyl group having 1 to 6 carbon atoms or a phenyl group. Examples of the alkyl group in $R^3$ include methyl groups, ethyl groups, propyl groups, butyl groups, pentyl groups, hexyl groups, heptyl groups, cyclopentyl groups and cyclohexyl groups. In addition, n is a positive number in the range of 3 to 100, and preferably a positive number in the range of 3 to 80. This is because if the value of n falls within the above-mentioned range, the coefficient of thermal expansion of the obtained cured product is significantly reduced and the mechanical strength of the obtained cured product is improved.

Examples of the component (B) include a cyclic organopolysiloxane comprising only the above-mentioned siloxane block and an organopolysiloxane which comprises only the above-mentioned siloxane block and in which both molecular terminals are capped. Examples of groups at the molecular chain terminals include hydroxyl groups; alkoxy groups such as methoxy groups, ethoxy groups and propoxy groups; and organosiloxy groups such as trimethylsiloxy groups, dimethylhydrogensiloxy groups, dimethylphenylsiloxy groups and methylphenylhydrogensiloxy groups. In addition, another example of the component (B) is a block copolymer in which the above-mentioned siloxane block (X') is linked to another siloxane block (Y'). Examples of such block copolymers include X'Y copolymers in which one block each of X' and Y are linked, X'YX' copolymers in which X' is linked to both terminals of Y, and (X'Y)z copolymers in which a number (z) of repetitions of X' and Y are alternately linked. Examples of this siloxane block (Y) are the same as those previously mentioned. Moreover, examples of groups at the molecular chain terminals of the block copolymer include hydroxyl groups, alkoxy groups similar to those mentioned above and organosiloxy groups similar to those mentioned above.

Examples of the organopolysiloxane of the component (B) include methylhydrogenpolysiloxanes capped at both molecular terminals with trimethylsiloxy groups, copolymers of dimethylsiloxane and methyl hydrogen siloxane capped at both molecular terminals with trimethylsiloxy groups, dimethylsiloxane methylhydrogensiloxane•methylphenylsiloxane copolymers capped at both molecular terminals with trimethylsiloxy groups, dimethylpolysiloxanes capped at both molecular terminals with dimethylhydrogensiloxy groups, dimethylsiloxane•methylphenylsiloxane copolymers capped at both molecular terminals with dimethylhydrogensiloxy groups, methylphenylpolysiloxanes capped at both molecular terminals with dimethylhydrogensiloxy groups, cyclic methylhydrogenpolysiloxanes, organopolysiloxane copolymers comprising siloxane units represented by the formula $R^1{}_3SiO_{1/2}$, siloxane units represented by the formula $R^1{}_2HSiO_{1/2}$ and siloxane units represented by the formula $SiO_{4/2}$, organopolysiloxane copolymers comprising siloxane units represented by the formula $R^1{}_2HSiO_{1/2}$ and siloxane units represented by the formula $SiO_{4/2}$, organopolysiloxane copolymers comprising siloxane units represented by the formula $R^1HSiO_{2/2}$ and siloxane units represented by the formula $R^1SiO_{3/2}$ and siloxane units represented by the formula $HSiO_{3/2}$, and mixtures of two or more of these organopolysiloxanes. Moreover, in the formulae, $R^1$ is an alkyl group having 1 to 6 carbon atoms or a phenyl group, examples of which are the same as those mentioned above. In addition, in these organopolysiloxanes, extremely small quantities of hydroxyl groups, alkoxy groups and the like may be bonded to silicon atoms in the molecule.

The content of the component (B) in the present composition, per 1 mol of alkenyl groups in the component (A), is in a range such that the silicon-bonded hydrogen atoms in the component (B) is in a range from 0.5 to 10 mol, and preferably in a range from 0.5 to 5 mol. This is because if the content of the component (B) is greater than or equal to the lower limit of the above-mentioned range, the coefficient of thermal expansion of the obtained cured product is significantly reduced, and if the content of the component (B) is lower than or equal to the upper limit of the above-mentioned range, the mechanical strength of the obtained cured product is improved.

Component (C) is a hydrosilylation catalyst used to accelerate curing of the present composition. Examples of the component (C) include platinum-based catalysts, rhodium-based catalysts and palladium-based catalysts. The component (C) is preferably a platinum-based catalyst so that the curing of the present composition can be dramatically accelerated. Examples of the platinum-based catalyst include a platinum fine powder, chloroplatinic acid, an alcohol solution of chloroplatinic acid, a platinum-alkenylsiloxane complex, a platinum-olefin complex, and a platinum-carbonyl complex. Examples of the alkenylsiloxane include 1,3-divinyl-1,1,3,3-tetramethyldisiloxane, 1,3,5,7-tetramethyl-1,3,5,7-tetravinylcyclotetrasiloxane, alkenylsiloxanes having part of the methyl groups of these alkenylsiloxane substituted by ethyl groups, phenyl groups, or the like, and alkenylsiloxanes having vinyl groups of these alkenylsiloxane substituted by allyl groups, hexenyl groups, or the like. In addition, in order to be able to improve the stability of this platinum-alkenylsiloxane complex, it is preferable to add to the complex an alkenylsiloxane such as 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, and 1,3,5,7-tetramethyl-1,3,5,7-tetravinylcyclotetrasiloxane or organosiloxane oligomers such as dimethylsiloxane oligomers.

In the present composition, the content of the component (C) is a catalytic quantity and is not particularly limited as long as there is a quantity sufficient to promote the curing of the present composition, but this content in the present composition, based on the metal atoms in the component (C), is preferably from 0.01 to 500 ppm, more preferably from 0.01 to 100 ppm, and particularly preferably from 0.01 to 50 ppm in terms of mass units. This is because the obtained composition is sufficiently cured if the content of the component (C) is greater than or equal to the lower limit of the above-mentioned range and the obtained composition is sufficiently cured even if the content of the component (C) is less than or equal to the upper limit of the above-mentioned range.

Component (D) is a component used to reduce the coefficient of thermal expansion of a cured product obtained by curing the present composition, and is an approximately spherical silica fine powder having an average particle diameter of 50 μm or less. Here, approximately spherical means rounded, spherical or truly spherical. In order to be able to improve the processability of the present composition, the major axis to minor axis ratio of the component (D) is preferably 1.5 or less, more preferably 1.2 or less, and particularly preferably 1.1 or less. Moreover, the lower limit of the average particle diameter of the component (D) is not particularly limited, but is preferably 1 μm or greater. This type of the component (D) may be a single silica fine powder, but may also be a mixture of two or more types of silica fine powder. From the perspectives of heat resistance, processability and economy, it is particularly preferable for the component (D) to be a fused silica fine powder.

The content of the component (D), in the present composition, per 100 parts total mass of the components (A) and (B), is greater than or equal to 200 parts by mass, and preferably is greater than or equal to 250 parts by mass, and particularly preferably is greater than or equal to 300. This is because it is possible to suppress the coefficient of thermal expansion of the obtained cured product if the content of the component (D) is greater than or equal to the lower limit of the above-mentioned range.

The glass fibers of component (E) are a component used to reduce the coefficient of thermal expansion of a cured product obtained by curing the present composition, and are a component used to suppress cracking upon curing. The average fiber length of the component (E) is 1,000 μm or less, preferably 500 μm or less, and particularly preferably 300 μm or less. This is because it is possible to impart the obtained composition with good workability if the average fiber length is less than or equal to the upper limit of the above-mentioned range. Moreover, the lower limit of the average fiber length of the component (E) is not limited, but is preferably 10 μm or greater, and particularly preferably 20 μm or greater. In addition, the average fiber diameter of the component (E) is 30 μm or less, preferably 25 μm or less, and particularly preferably 20 μm or less. This is because if the average fiber diameter is lower than or equal to the upper limit of the above-mentioned range, the mechanical strength of the obtained cured product is improved. Moreover, the lower limit of the average fiber diameter of the component (E) is not limited, but is preferably 1 μm or greater.

The content of the component (E) in the present composition, per 100 parts total mass of the components (A) and (B), is greater than or equal to 25 parts by mass, and preferably is greater than or equal to 30 parts by mass. This is because cracks hardly occur in the cured product when the present composition is cured if the content of the component (E) is greater than or equal to the lower limit of the above-mentioned range.

Moreover, in the present composition, the total content of the component (D) and the component (E) is 900 parts by mass or less, preferably 800 parts by mass or less, and particularly preferably 700 parts by mass or less, relative to a total of 100 parts by mass of the component (A) and the component (B). This is because the fluidity of the present composition is good and the handling/workability and processability of the present composition is improved if the total content of the component (D) and the component (E) is lower than or equal to the upper limit of the above-mentioned range.

The present composition comprises at least the above-mentioned components (A) to (E), but may also contain (G) non-silicone monomer having two or more of polymerizable double bond as another optional component. The "polymerizable double bond" means reactive C—C double bond for polymerization reaction. Especially, by using component (G) with said component $(A_1)$ together or using component (G) in lieu of the component $(A_1)$, there is an advantage of having a low coefficient of thermal expansion and further improvement on its adhesion to the substrate and thermal stability in the cured body. Though such component (G) is not limited specifically, preferred examples of the component (G) include divinylbenzene, divinylnaphthalene, allyl methacrylate, triacrylformal, triallylisocyanurate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, polyethylene glycol (PEG#200) di(meth)acrylate with a weight average molecular weight of 200, polyethylene glycol (PEG#400) di(meth) acrylate with a weight average molecular weight of 400, 1,6-hexanediol (meth)acrylate, and trimethylolpropane trimethacrylate. Specifically preferred one is triallylisocyanurate. In the present composition, the content of the component (G) is not limited, but is preferably from 30 to 100 parts by mass, and more preferably from 40 to 80parts by mass, per 100 parts total mass of the component (A) and the component (B).

The present composition comprises at least the above-mentioned components (A) to (E), but may also contain (F) an adhesion promoter as another optional component. Examples of the component (F) include organosilanes or organosiloxane oligomers having approximately 4 to 20 silicon atoms and a linear, branched or cyclic structure and having a trialkoxysiloxy group (for example, a trimethoxysiloxy group or triethoxysiloxy group) or trialkoxysilylalkyl group (for example, a trimethoxysilylethyl group or triethoxysilylethyl group) and a hydrosilyl group or alkenyl group (for example, a vinyl group or allyl group); organosilanes or organosiloxane oligomers having approximately 4 to 20 silicon atoms and a linear, branched or cyclic structure and having a trialkoxysiloxy group or trialkoxysilylalkyl group and a methacryloxyalkyl group (for example, a 3-methacryloxypropyl group); organosilanes or organosiloxane oligomers having approximately 4 to 20 silicon atoms and a linear, branched or cyclic structure and having a trialkoxysiloxy group or trialkoxysilylalkyl group and an epoxy group-bonded alkyl group (for example, a 3-glycidoxypropyl group, 4-glycidoxybutyl group, 2-(3,4-epoxycyclohexyl)ethyl group or 3-(3,4-epoxycyclohexyl)propyl group); and products of reactions between aminoalkyltrialkoxysilanes and epoxy group-bonded alkyltrialkoxysilanes, and epoxy group-containing ethyl polysilicates. Specific examples of the component (F) include vinyltrimethoxysilane, allyltrimethoxysilane, allyltriethoxysilane, hydrogentriethoxysilane, 3-glycidoxypropyltrimethoxysilane, 3-glycidoxypropyltriethoxysilane, 2-(3,4-epoxycyclohexyl)ethyltrimethoxysilane, 3-methacryloxypropyltrimethoxysilane, 3-methacryloxypropyltriethoxysilane, products of reactions between 3-glycidoxypropyltriethoxysilane and 3-aminopropyltriethoxysilane, products of condensation reactions between methylvinylsiloxane oligomers having both molecular terminals capped with hydroxyl groups and 3-glycidoxypropyltrimethoxysilane, products of condensation reactions between methylvinylsiloxane oligomers having both molecular terminals capped with hydroxyl groups and 3-methacryloxypropyltriethoxysilane, and tris(3-trimethoxysilylpropyl) isocyanurate. In the present composition, the content of the component (F) is not limited, but is preferably from 0.1 to 30 parts by mass, and more preferably from 5 to 30 parts by mass, per 100 parts total mass of the component (A) and the component (B).

In addition, the present composition may contain a reaction inhibitor in order to appropriately control the speed of the curing reaction of the composition. Examples of this reaction inhibitor include alkyne alcohols such as 1-ethynylcyclohexan-1-ol, 2-methyl-3-butyn-2-ol, 3,5-dimethyl-1-hexyn-3-ol and 2-phenyl-3-butyn-2-ol; ene-yne compounds such as 3-methyl-3-penten-1-yne and 3,5-dimethyl-3-hexen-1-yne; alkynoxysilanes such as 1,1-dimethylpropynoxytrimethylsilane, bis(1,1-dimethylpropynoxy)dimethylsilane, bis(1,1-dimethylpropynoxy)methylvinylsilane and tris(1,1-dimethylpropynoxy)methylsilane; and benzotriazoles. In the present composition, the content of the reaction inhibitor is not limited, but is preferably from 1 to 5000 ppm relative to the present composition in terms of mass units.

Furthermore, as long as the object of the present invention is not impaired, the present composition may contain an inorganic filler other than the component (D) and the component (E). Examples of this inorganic filler include inorganic fillers such as fumed silica, precipitated silica, baked silica, fused silica, quartz fine powders, calcium carbonate, titanium dioxide, diatomaceous earth, aluminum hydroxide, finely particulate alumina, magnesia, zinc oxide, zinc carbonate and metal fine powders; and inorganic fillers obtained by surface treating these fillers with silane compounds, silazane compounds, siloxane compounds having low degrees of polymerization, organic compounds and the like.

The viscosity at 25° C. of the present composition is not particularly limited, but from the perspective of handling/workability is preferably from 100 to 1,000,000 mPa·s, and more preferably from 500 to 500,000 mPa·s.

The cured product of the present invention will now be described in detail.

The cured product of the present invention is obtained by curing the above-mentioned composition and is characterized by having a low coefficient of thermal expansion. Because the coefficient of thermal expansion of the present cured product depends upon the type and content of the component (D) or the component (E), the hardness of the cured product, and so on, the value of the coefficient of thermal expansion cannot be uniformly defined, but the average coefficient of linear expansion within the temperature range 25 to 300° C., as measured using the method stipulated in JIS K 7197-1991 "Testing method for linear thermal expansion coefficient of plastics by thermomechanical analysis", is preferably 100 ppm/° C. or lower, more preferably 50 ppm/° C. or lower, and particularly preferably 30 ppm/° C. or lower.

EXAMPLES

The curable silicone composition of the present invention and a cured product thereof will now be described using practical examples. Moreover, the viscosity (units: mPa·s) is a value measured at 25° C. in accordance with JIS K7117-2 using a rotational viscometer (AR 2000 EX manufactured by T.A. Instruments) at a shear rate of 5 s$^{-1}$, and the kinetic viscosity (units; mm$^2$/s) is a value measured at 25° C. in accordance with JIS Z8803 using a capillary tube viscometer. Moreover, Me in the formulae represents a methyl group, and Vi in the formulae represents a vinyl group.

In addition, the viscosity of the curable silicone composition, the physical properties (flexural breaking strength, flexural modulus of elasticity, flexural strain and linear expansion coefficient) of the cured product, the presence/absence of cracking upon curing and the bonding strength were evaluated as follows.

(Viscosity of Curable Silicone Composition)

The viscosity at 25° C. of the curable silicone composition was measured in accordance with JIS K7117-2 using a rotational viscometer (AR 2000 EX manufactured by T.A. Instruments) at a shear rate of 5 s$^{-1}$.

(Flexural Breaking Strength, Flexural Modulus of Elasticity and Flexural Strain of Cured Product)

A cured product was produced by heating the curable silicone composition for 1 hour at 150° C. The flexural breaking strength, flexural modulus of elasticity and flexural strain of this cured product were measured using the methods stipulated in JIS K 6911-1995 "Testing methods for thermosetting plastics".

(Linear Expansion Coefficient of Cured Product)

A cured product was produced by heating the curable silicone composition for 1 hour at 200° C. The linear expansion coefficient of this cured product in the temperature range of 30 to 300° C. was measured using a TM 9200 manufactured by Ulvac-Riko, Inc., using the method stipulated in JIS K 7197-1991 "Testing method for linear thermal expansion coefficient of plastics by thermomechanical analysis".

(Presence/Absence of Cracking upon Curing)

1 g portions of a curable silicone composition were weighed out, placed on a copper sheet, a PPS sheet and a nickel-plated steel plate, and spread thinly into circles having diameters of 2 cm. After being cured by heating for 1 hour at 150° C., the cured products were allowed to stand for 3 days at 25° C. Five test pieces were prepared in the same way. It was observed visually whether or not cracking occurred in the cured products, and the proportion of test pieces in which cracking occurred in the cured product was determined.

(Bonding Strength)

A curable silicone composition were placed on a copper sheet, a PPS sheet and a nickel-plated steel plate, and spread into circles having diameters of 6 cm with thickness of 6 mm. Then, an aluminum square plate having 1 cm on side and thickness of 1 mm was placed on the coating layer and the bonded body was obtained by heating for 1 hour at 150° C. The bonding strength of the bonded body was determined by bringing a sear force at a shear rate of 10 mm/min on the body with Die Shear Tester.

Practical Example 1

5.01 parts by mass of a dimethylpolysiloxane capped at both molecular terminals with dimethylvinylsiloxy groups (vinyl group content=0.44 mass %) having a viscosity of 400 mPa·s, 5.15 parts by mass of a cyclic methylvinylpolysiloxane having a viscosity of 3 mm$^2$/s and represented by the formula:

$(MeViSiO)_4$ (vinyl group content=31.4 mass %), 6.41 parts by mass (a quantity whereby the amount of silicon-bonded hydrogen atoms in the present component is 1.5 moles relative to a total of 1 mole of vinyl groups in the above-mentioned dimethylpolysiloxane and cyclic methylvinylpolysiloxane) of a methylhydrogenpolysiloxane capped at both molecular terminals with trimethylsiloxy groups having a viscosity of 5 mm$^2$/s and represented by the formula:

$Me_3SiO(MeHSiO)_{14}SiMe_3$ (silicon-bonded hydrogen atom content=1.42 mass %), 1.72 parts by mass of a product (vinyl group content=16 mass %) which is obtained from a condensation reaction between a methylvinylsiloxane oligomer capped at both molecular terminals with hydroxyl groups and 3-glycidoxypropyltrimethoxysilane at a mass ratio of 1:1 and which has a viscosity of 30 mPa·s, 69.24 parts by mass of a spherical fused silica fine powder having an average particle diameter of 15 μm and a major axis to minor axis ratio of 1.05 (HS-202 produced by Nippon Steel & Sumikin Materials Co., Ltd. Micron Co.), 12.22 parts by mass of glass fibers having an average fiber length of 100 μm and an average fiber diameter of 11 μm (EFH 100-31 produced by Central Glass Co., Ltd.), a 1,3-divinyl-1,1,3,3-tetramethyldisiloxane solution of platinum-1,3-divinyl-1,1,3,3-tetramethyldisiloxane (at a quantity whereby the amount of platinum is 11 ppm in terms of mass relative to the present composition) and 0.07 parts by mass of tris(1,1-dimethylpropynoxy)methylsilane were mixed to produce a curable silicone composition.

Practical Example 2

4.34 parts by mass of a dimethylpolysiloxane capped at both molecular terminals with dimethylvinylsiloxy groups and having a viscosity of 400 mPa·s (vinyl group content=0.44 mass %), 3.63 parts by mass of a cyclic methylvinylpolysiloxane having a viscosity of 3 mm$^2$/s and represented by the formula:

$(MeViSiO)_4$ (vinyl group content=31.4 mass %), 4.91 parts by mass (a quantity whereby the amount of silicon-bonded hydrogen atoms in the present component is 1.6 moles relative to a total of 1 mole of vinyl groups in the above-mentioned dimethylpolysiloxane and cyclic methylvinylpolysiloxane) of a methylhydrogenpolysiloxane capped at both molecular terminals with trimethylsiloxy groups, having a viscosity of 5 mm$^2$/s and represented by the formula:

$Me_3SiO(MeHSiO)_{14}SiMe_3$ (silicon-bonded hydrogen atom content=1.42 mass %), 2.32 parts by mass of a product (vinyl group content=16 mass %) which is obtained from a condensation reaction between a methylvinylsiloxane oligomer capped at both molecular terminals with hydroxyl groups and 3-glycidoxypropyltrimethoxysilane at a mass ratio of 1:1 and which has a viscosity of 30 mPa·s, 59.20 parts by mass of a spherical fused silica fine powder having an average particle diameter of 15 μm and a major axis to minor axis ratio of 1.05 (HS-202 produced by Nippon Steel & Sumikin Materials Co., Ltd. Micron Co.), 25.37 parts by mass of glass fibers having an average fiber length of 100 μm and an average fiber diameter of 11 μm (EFH 100-31 produced by Central Glass Co., Ltd.), a 1,3-divinyl-1,1,3,3-tetramethyldisiloxane solution of platinum-1,3-divinyl-1,1,3,3-tetramethyldisiloxane (at a quantity whereby the amount of platinum is 11 ppm in terms of mass relative to the present composition) and 0.07 parts by mass of tris(1,1-dimethylpropynoxy)methylsilane were mixed to produce a curable silicone composition.

Practical Example 3

5.01 parts by mass of a dimethylpolysiloxane capped at both molecular terminals with dimethylvinylsiloxy groups (vinyl group content=0.44 mass %) having a viscosity of 400 mPa·s, 5.15 parts by mass of a cyclic methylvinylpolysiloxane having a viscosity of 3 mm$^2$/s and represented by the formula:

$(MeViSiO)_4$ (vinyl group content=31.4 mass %), 6.41 parts by mass (a quantity whereby the amount of silicon-bonded hydrogen atoms in the present component is 1.5 moles relative to a total of 1 mole of vinyl groups in the above-mentioned dimethylpolysiloxane and cyclic methylvinylpolysiloxane) of a methylhydrogenpolysiloxane capped at both molecular terminals with trimethylsiloxy groups having a viscosity of 5 mm$^2$/s and represented by the formula:

$Me_3SiO(MeHSiO)_{14}SiMe_3$ (silicon-bonded hydrogen atom content=1.42 mass %), 1.72 parts by mass of a product (vinyl group content=16 mass %) which is obtained from a condensation reaction between a methylvinylsiloxane oligomer capped at both molecular terminals with hydroxyl groups and 3-glycidoxypropyltrimethoxysilane at a mass ratio of 1:1 and which has a viscosity of 30 mPa·s, 69.24 parts by mass of a spherical fused silica fine powder having an average particle diameter of 15 μm and a major axis to minor axis ratio of 1.05 (HS-202 produced by Nippon Steel & Sumikin Materials Co., Ltd. Micron Co.), 12.22 parts by mass of glass fibers having an average fiber length of 50 μm and an average fiber diameter of 6 μm (EFDE 50-31 produced by Central Glass Co., Ltd.), a 1,3-divinyl-1,1,3,3-tetramethyldisiloxane solution of platinum-1,3-divinyl-1,1,3,3-tetramethyldisiloxane (at a quantity whereby the amount of platinum is 11 ppm in terms of mass relative to the present composition) and 0.07 parts by mass of tris(1,1-dimethylpropynoxy)methylsilane were mixed to produce a curable silicone composition.

Practical Example 4

6.00 parts by mass of a dimethylpolysiloxane capped at both molecular terminals with dimethylvinylsiloxy groups (vinyl group content=0.44 mass %) having a viscosity of 400 mPa·s, 6.17 parts by mass of a cyclic methylvinylpolysiloxane having a viscosity of 3 mm$^2$/s and represented by the formula:

(MeViSiO)$_4$ (vinyl group content=31.4 mass %), 7.68 parts by mass (a quantity whereby the amount of silicon-bonded hydrogen atoms in the present component is 1.5 moles relative to a total of 1 mole of vinyl groups in the above-mentioned dimethylpolysiloxane and cyclic methylvinylpolysiloxane) of a methylhydrogenpolysiloxane capped at both molecular terminals with trimethylsiloxy groups having a viscosity of 5 mm$^2$/s and represented by the formula:

Me$_3$SiO(MeHSiO)$_{14}$SiMe$_3$ (silicon-bonded hydrogen atom content=1.42 mass %), 2.05 parts by mass of a product (vinyl group content=16 mass %) which is obtained from a condensation reaction between a methylvinylsiloxane oligomer capped at both molecular terminals with hydroxyl groups and 3-glycidoxypropyltrimethoxysilane at a mass ratio of 1:1 and which has a viscosity of 30 mPa·s, 47.89 parts by mass of a spherical fused silica fine powder having an average particle diameter of 15 μm and a major axis to minor axis ratio of 1.05 (HS-202 produced by Nippon Steel & Sumikin Materials Co., Ltd. Micron Co.), 29.93 parts by mass of glass fibers having an average fiber length of 50 μm and an average fiber diameter of 6 μm (EFDE 50-31 produced by Central Glass Co., Ltd.), a 1,3-divinyl-1,1,3,3-tetramethyldisiloxane solution of platinum-1,3-divinyl-1,1,3,3-tetramethyldisiloxane (at a quantity whereby the amount of platinum is 11 ppm in terms of mass relative to the present composition) and 0.08 parts by mass of tris(1,1-dimethylpropynoxy)methylsilane were mixed to produce a curable silicone composition.

Practical Example 5

5.01 parts by mass of a dimethylpolysiloxane capped at both molecular terminals with dimethylvinylsiloxy groups (vinyl group content=0.44 mass %) having a viscosity of 400 mPa·s, 5.15 parts by mass of a cyclic methylvinylpolysiloxane having a viscosity of 3 mm$^2$/s and represented by the formula:

(MeViSiO)$_4$ (vinyl group content=31.4 mass %), 6.41 parts by mass (a quantity whereby the amount of silicon-bonded hydrogen atoms in the present component is 1.5 moles relative to a total of 1 mole of vinyl groups in the above-mentioned dimethylpolysiloxane and cyclic methylvinylpolysiloxane) of a methylhydrogenpolysiloxane capped at both molecular terminals with trimethylsiloxy groups having a viscosity of 5 mm$^2$/s and represented by the formula:

Me$_3$SiO(MeHSiO)$_{14}$SiMe$_3$ (silicon-bonded hydrogen atom content=1.42 mass %), 1.72 parts by mass of a product (vinyl group content=16 mass %) which is obtained from a condensation reaction between a methylvinylsiloxane oligomer capped at both molecular terminals with hydroxyl groups and 3-glycidoxypropyltrimethoxysilane at a mass ratio of 1:1 and which has a viscosity of 30 mPa·s, 69.24 parts by mass of a spherical fused silica fine powder having an average particle diameter of 7 μm and a major axis to minor axis ratio of 1.05 (MSS-7LV produced by Tatsumori Ltd.), 12.22 parts by mass of glass fibers having an average fiber length of 100 μm and an average fiber diameter of 11 μm (EFH 100-31 produced by Central Glass Co., Ltd.), a 1,3-divinyl-1,1,3,3-tetramethyldisiloxane solution of platinum-1,3-divinyl-1,1,3,3-tetramethyldisiloxane (at a quantity whereby the amount of platinum is 11 ppm in terms of mass relative to the present composition) and 0.07 parts by mass of tris(1,1-dimethylpropynoxy)methylsilane were mixed to produce a curable silicone composition.

Practical Example 6

5.01 parts by mass of a dimethylpolysiloxane capped at both molecular terminals with dimethylvinylsiloxy groups (vinyl group content=0.44 mass %) having a viscosity of 400 mPa·s, 5.15 parts by mass of a methylvinylpolysiloxane capped at both molecular terminals with dimethylvinylsiloxy groups, having a viscosity of 3 mm$^2$/s and represented by the formula:

Me$_2$ViSiO(MeViSiO)$_9$SiMe$_2$Vi (vinyl group content=31.0 mass %), 6.41 parts by mass (a quantity whereby the amount of silicon-bonded hydrogen atoms in the present component is 1.8 moles relative to a total of 1 mole of vinyl groups in the above-mentioned dimethylpolysiloxane and cyclic methylvinylpolysiloxane) of a cyclic methylhydrogenpolysiloxane having a viscosity of 1 mm$^2$/s and represented by the formula:

(MeHSiO)$_4$ (silicon-bonded hydrogen atom content=1.66 mass %), 1.72 parts by mass of a product (vinyl group content=16 mass %) which is obtained from a condensation reaction between a methylvinylsiloxane oligomer capped at both molecular terminals with hydroxyl groups and 3-glycidoxypropyltrimethoxysilane at a mass ratio of 1:1 and which has a viscosity of 30 mPa·s, 69.24 parts by mass of a spherical fused silica fine powder having an average particle diameter of 15 μm and a major axis to minor axis ratio of 1.05 (HS-202 produced by Nippon Steel & Sumikin Materials Co., Ltd. Micron Co.), 12.22 parts by mass of glass fibers having an average fiber length of 100 μm and an average fiber diameter of 11 μm (EFH 100-31 produced by Central Glass Co., Ltd.), a 1,3-divinyl-1,1,3,3-tetramethyldisiloxane solution of platinum-1,3-divinyl-1,1,3,3-tetramethyldisiloxane (at a quantity whereby the amount of platinum is 11 ppm in terms of mass relative to the present composition) and 0.07 parts by mass of tris(1,1-dimethylpropynoxy)methylsilane were mixed to produce a curable silicone composition.

Practical Example 7

7.32 parts by mass of a dimethylpolysiloxane capped at both molecular terminals with dimethylvinylsiloxy groups (vinyl group content=0.44 mass %) having a viscosity of 400 mPa·s, 7.53 parts by mass of a cyclic methylvinylpolysiloxane having a viscosity of 3 mm²/s and represented by the formula:

(MeViSiO)$_4$ (vinyl group content=31.4 mass %), 9.37 parts by mass (a quantity whereby the amount of silicon-bonded hydrogen atoms in the present component is 1.5 moles relative to a total of 1 mole of vinyl groups in the above-mentioned dimethylpolysiloxane and cyclic methylvinylpolysiloxane) of a methylhydrogenpolysiloxane capped at both molecular terminals with trimethylsiloxy groups having a viscosity of 5 mm²/s and represented by the formula:

Me$_3$SiO(MeHSiO)$_{14}$SiMe$_3$ (silicon-bonded hydrogen atom content=1.42 mass %), 2.51 parts by mass of a product (vinyl group content=16 mass %) which is obtained from a condensation reaction between a methylvinylsiloxane oligomer capped at both molecular terminals with hydroxyl groups and 3-glycidoxypropyltrimethoxysilane at a mass ratio of 1:1 and which has a viscosity of 30 mPa·s, 62.14 parts by mass of a spherical fused silica fine powder having an average particle diameter of 25 μm and a major axis to minor axis ratio of 1.12 (HS-304 produced by Nippon Steel & Sumikin Materials Co., Ltd. Micron Co.), 10.97 parts by mass of glass fibers having an average fiber length of 100 μm and an average fiber diameter of 11 μm (EFH 100-31 produced by Central Glass Co., Ltd.), a 1,3-divinyl-1,1,3,3-tetramethyldisiloxane solution of platinum-1,3-divinyl-1,1,3,3-tetramethyldisiloxane (at a quantity whereby the amount of platinum is 11 ppm in terms of mass relative to the present composition) and 0.07 parts by mass of tris(1,1-dimethylpropynoxy)methylsilane were mixed to produce a curable silicone composition.

Comparative Example 1

4.34 parts by mass of a dimethylpolysiloxane capped at both molecular terminals with dimethylvinylsiloxy groups and having a viscosity of 400 mPa·s (vinyl group content=0.44 mass %), 3.63 parts by mass of a cyclic methylvinylpolysiloxane having a viscosity of 3 mm²/s and represented by the formula:

(MeViSiO)$_4$ (vinyl group content=31.4 mass %), 4.91 parts by mass (a quantity whereby the amount of silicon-bonded hydrogen atoms in the present component is 1.6 moles relative to a total of 1 mole of vinyl groups in the above-mentioned dimethylpolysiloxane and cyclic methylvinylpolysiloxane) of a methylhydrogenpolysiloxane capped at both molecular terminals with trimethylsiloxy groups, having a viscosity of 5 mm²/s and represented by the formula:

Me$_3$SiO(MeHSiO)$_{14}$SiMe$_3$ (silicon-bonded hydrogen atom content=1.42 mass %), 2.32 parts by mass of a product (vinyl group content=16 mass %) which is obtained from a condensation reaction between a methylvinylsiloxane oligomer capped at both molecular terminals with hydroxyl groups and 3-glycidoxypropyltrimethoxysilane at a mass ratio of 1:1 and which has a viscosity of 30 mPa·s, 84.57 parts by mass of a spherical fused silica fine powder having an average particle diameter of 15 μm and a major axis to minor axis ratio of 1.05 (HS-202 produced by Nippon Steel & Sumikin Materials Co., Ltd. Micron Co.), a 1,3-divinyl-1,1,3,3-tetramethyldisiloxane solution of platinum-1,3-divinyl-1,1,3,3-tetramethyldisiloxane (at a quantity whereby the amount of platinum is 11 ppm in terms of mass relative to the present composition) and 0.07 parts by mass of tris(1,1-dimethylpropynoxy)methylsilane were mixed to produce a curable silicone composition.

Comparative Example 2

12.53 parts by mass of a dimethylpolysiloxane capped at both molecular terminals with dimethylvinylsiloxy groups (vinyl group content=0.44 mass %) having a viscosity of 400 mPa·s, 12.83 parts by mass of a cyclic methylvinylpolysiloxane having a viscosity of 3 mm²/s and represented by the formula:

(MeViSiO)$_4$ (vinyl group content=31.4 mass %), 16.04 parts by mass (a quantity-whereby the amount of silicon-bonded hydrogen atoms in the present component is 1.5 moles relative to a total of 1 mole of vinyl groups in the above-mentioned dimethylpolysiloxane and cyclic methylvinylpolysiloxane) of a methylhydrogenpolysiloxane capped at both molecular terminals with trimethylsiloxy groups having a viscosity of 5 mm²/s and represented by the formula:

Me$_3$SiO(MeHSiO)$_{14}$SiMe$_3$ (silicon-bonded hydrogen atom content=1.42 mass %), 4.21 parts by mass of a product (vinyl group content=16 mass %) which is obtained from a condensation reaction between a methylvinylsiloxane oligomer capped at both molecular terminals with hydroxyl groups and 3-glycidoxypropyltrimethoxysilane at a mass ratio of 1:1 and which has a viscosity of 30 mPa·s, 54.14 parts by mass of glass fibers having an average fiber length of 50 μm and an average fiber diameter of 6 μm (EFDE 50-31 produced by Central Glass Co., Ltd.), a 1,3-divinyl-1,1,3,3-tetramethyldisiloxane solution of platinum-1,3-divinyl-1,1,3,3-tetramethyldisiloxane (at a quantity whereby the amount of platinum is 11 ppm in terms of mass relative to the present composition) and 0.07 parts by mass of tris(1,1-dimethylpropynoxy)methylsilane were mixed to produce a curable silicone composition.

Comparative Example 3

5.01 parts by mass of a dimethylpolysiloxane capped at both molecular terminals with dimethylvinylsiloxy groups (vinyl group content=0.44 mass %) having a viscosity of 400 mPa·s, 5.15 parts by mass of a cyclic methylvinylpolysiloxane having a viscosity of 3 mm²/s and represented by the formula:

(MeViSiO)$_4$ (vinyl group content=31.4 mass %), 6.41 parts by mass (a quantity whereby the amount of silicon-bonded hydrogen atoms in the present component is 1.5 moles relative to a total of 1 mole of vinyl groups in the above-mentioned dimethylpolysiloxane and cyclic methylvinylpolysiloxane) of a methylhydrogenpolysiloxane capped at both molecular terminals with trimethylsiloxy groups having a viscosity of 5 mm²/s and represented by the formula:

Me$_3$SiO(MeHSiO)$_{14}$SiMe$_3$ (silicon-bonded hydrogen atom content=1.42 mass %), 1.72 parts by mass of a product (vinyl group content=16 mass %) which is obtained from a condensation reaction between a methylvinylsiloxane oligomer capped at both molecular terminals with hydroxyl groups and 3-glycidoxypropyltrimethoxysilane at a mass ratio of 1:1 and which has a viscosity of 30 mPa·s, 69.24 parts by mass of a spherical fused silica fine powder having an average particle diameter of 15 μm and a major axis to minor axis ratio of 1.05 (HS-202 produced by Nippon Steel & Sumikin Materials Co., Ltd. Micron Co.), 7.00 parts by mass of glass fibers having an average fiber length of 3000 μm and an average fiber diameter of 9 μm (ECS03-630 produced by Central Glass Co., Ltd.), a 1,3-divinyl-1,1,3,3-tetramethyldisiloxane solution of platinum-1,3-divinyl-1,1,3,3-tetramethyldisiloxane (at a quantity whereby the amount of platinum is 11 ppm in terms of mass relative to the present composition) and 0.07 parts by mass of tris(1,1-dimethylpropynoxy)methylsilane were mixed to produce a curable silicone composition.

Practical Example 8

5.01 parts by mass of a dimethylpolysiloxane capped at both molecular terminals with dimethylvinylsiloxy groups (vinyl group content=0.44 mass %) having a viscosity of 400 mPa·s, 5.77 parts by mass of a triallylisocyanurate, 5.80 parts by mass (a quantity whereby the amount of silicon-bonded hydrogen atoms in the present component is 1.5 moles relative to a total of 1 mole of vinyl groups in the above-mentioned dimethylpolysiloxane and triallylisocyanurate) of a methylhydrogenpolysiloxane capped at both molecular terminals with trimethylsiloxy groups having a viscosity of 5 mm$^2$/s and represented by the formula:

$$Me_3SiO(MeHSiO)_{14}SiMe_3$$

(silicon-bonded hydrogen atom content=1.42 mass %), 1.72 parts by mass of a product (vinyl group content=16 mass %) which is obtained from a condensation reaction between a methylvinylsiloxane oligomer capped at both molecular terminals with hydroxyl groups and 3-glycidoxypropyltrimethoxysilane at a mass ratio of 1:1 and which has a viscosity of 30 mPa·s, 69.24 parts by mass of a spherical fused silica fine powder having an average particle diameter of 15 μm and a major axis to minor axis ratio of 1.05 (HS-202 produced by Nippon Steel & Sumikin Materials Co., Ltd. Micron Co.), 7.00 parts by mass of glass fibers having an average fiber length of 100 μm and an average fiber diameter of 11 μm (EFH 100-31 produced by Central Glass Co., Ltd.), a 1,3-divinyl-1,1,3,3-tetramethyldisiloxane solution of platinum-1,3-divinyl-1,1,3,3-tetramethyldisiloxane (at a quantity whereby the amount of platinum is 11 ppm in terms of mass relative to the present composition) and 0.07 parts by mass of tris(1,1-dimethylpropynoxy)methylsilane were mixed to produce a curable silicone composition.

TABLE 1

| | | Category Present invention Practical Example | | | | |
|---|---|---|---|---|---|---|
| Item | | 1 | 2 | 3 | 4 | 5 |
| Viscosity of curable silicone composition (Pa·s) | | 4.0 | 30 | 2.1 | 14 | 1.4 |
| Physical properties of cured product | Coefficient of thermal expansion (ppm/°C.) | 19 | 16 | 23 | 20 | 18 |
| | Flexural breaking strength (MPa) | 15 | 27 | 15 | 21 | 15 |
| | Bending Elastic Modulus (GPa) | 2.1 | 4.3 | 1.8 | 3.1 | 2.0 |
| | Flexural strain (%) | 0.73 | 0.70 | 0.87 | 0.80 | 0.78 |
| Proportion of cracked products upon curing | On copper sheet | 0/5 | 0/5 | 0/5 | 0/5 | 0/5 |
| | On PPS sheet | 0/5 | 0/5 | 0/5 | 0/5 | 0/5 |
| | On nickel-plated steel plate | 0/5 | 0/5 | 0/5 | 0/5 | 0/5 |
| Bonding strength | On copper sheet (MPa) | 8.1 | 6.6 | 3.7 | 5.6 | 4.9 |
| | On PPS sheet (MPa) | 4.3 | 4.3 | 2.5 | 1.4 | 3.4 |
| | On nickel-plated steel plate (MPa) | 3.6 | 2.1 | 2.0 | 1.5 | 2.7 |

| | | Category | | | | | |
|---|---|---|---|---|---|---|---|
| | | Present invention Practical Example | | | Comparative Examples Comparative Example | | |
| Item | | 6 | 7 | 8 | 1 | 2 | 3 |
| Viscosity of curable silicone composition (Pa·s) | | 3.0 | 13 | 10 | 3.5 | 5.2 | 80 |
| Physical properties of cured product | Coefficient of thermal expansion (ppm/°C.) | 16 | 19 | 18 | 19 | 24 | 26 |
| | Flexural breaking strength (MPa) | 5 | 12 | 15 | 18 | 20 | 13 |
| | Bending Elastic Modulus (GPa) | 1.0 | 2.3 | 2.2 | 2.4 | 1.8 | 2.0 |
| | Flexural strain (%) | 0.54 | 0.59 | 0.81 | 0.83 | 1.36 | 0.70 |
| Proportion of cracked | On copper sheet | 0/5 | 0/5 | 0/5 | 5/5 | 5/5 | 3/5 |
| | On PPS sheet | 0/5 | 0/5 | 0/5 | 5/5 | 5/5 | 0/5 |

| | | | | | | | |
|---|---|---|---|---|---|---|---|
| products upon curing | On nickel-plated steel plate | 0/5 | 0/5 | 0/5 | 3/5 | 0/5 | 0/5 |
| Bonding strength | On copper sheet (MPa) | 0.2 | 4.1 | 2.7 | 6.1 | 0.7 | 5.1 |
| | On PPS sheet (MPa) | 0.1 | 2.3 | 2.2 | 2.1 | 1.0 | 0 |
| | On nickel-plated steel plate (MPa) | 2.1 | 1.5 | 6.3 | 3.3 | 1.1 | 0 |

INDUSTRIAL APPLICABILITY

The curable silicone composition of the present invention hardly cracks upon curing and gives a cured product having a low coefficient of thermal expansion, and is therefore suitable for use as a sealing agent or potting agent for electrical or electronic components, such as semiconductor elements and power semiconductor elements.

The invention claimed is:

1. A curable silicone composition comprising:
   (A) an organopolysiloxane having at least two alkenyl groups in a molecule;
   (B) an organopolysiloxane having at least two silicon-bonded hydrogen atoms in a molecule, included at a quantity whereby an amount of silicon-bonded hydrogen atoms in the component (B) is from 0.5 to 10 moles per 1 mole of the alkenyl groups in the component (A);
   (C) a catalytic quantity of a hydrosilylation reaction catalyst;
   (D) an approximately spherical silica fine powder having an average particle diameter of 50 μm or less, included at a quantity of 200 parts by mass or more relative to a total of 100 parts by mass of the component (A) and the component (B); and
   (E) glass fibers having an average fiber length of 1,000 μm or less and an average fiber diameter of 30 μm or less, included at a quantity of 25 parts by mass or more relative to a total of 100 parts by mass of the component (A) and the component (B);
   wherein the total content of the component (D) and the component (E) is 900 parts by mass or less relative to the total of 100 parts by mass of the component (A) and the component (B).

2. The curable silicone composition according to claim 1, wherein the component (A) is an organopolysiloxane comprising:
   30 to 100 mass % of ($A_1$) an organopolysiloxane comprising a siloxane block represented by the general formula:

—($R^1R^2$SiO)$_m$— 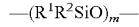

wherein, $R^1$ is an alkyl group having 1 to 6 carbon atoms or a phenyl group, $R^2$ is an alkenyl group having 2 to 10 carbon atoms, and m is a positive number in a range of 3 to 50; and
   0 to 70 mass % of ($A_2$) an organopolysiloxane which does not have the above-mentioned siloxane block and which contains at least two alkenyl groups in a molecule.

3. The curable silicone composition according to claim 1, wherein the component (B) is an organopolysiloxane comprising a siloxane block represented by the general formula:

—($R^3$HSiO)$_n$— wherein, $R^3$ is an alkyl group having 1 to 6 carbon atoms or a phenyl group, and n is a positive number in a range of 3 to 100.

4. The curable silicone composition according to claim 1, wherein the component (D) is a fused silica fine powder.

5. The curable silicone composition according to claim 1, wherein the component (E) is milled glass fibers.

6. The curable silicone composition according to claim 1, further comprising a reaction inhibitor and (G) non-silicone monomer having two or more of polymerizable double bonds, wherein component (G) is divinylbenzene, divinylnaphthalene, allyl methacrylate, triacrylformal, triallylisocyanurate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, polyethylene glycol (PEG#200) di(meth)acrylate with a weight average molecular weight of 200, polyethylene glycol (PEG#400) di(meth)acrylate with a weight average molecular weight of 400, 1,6-hexanediol (meth)acrylate, or trimethylolpropane trimethacrylate.

7. The curable silicone composition according to claim 6, wherein the component (G) is a triallylisocyanurate.

8. The curable silicone composition according to claim 1, further comprising (F) an adhesion promoter.

9. A cured product produced by curing the curable silicone composition described in claim 1.

10. The curable silicone composition according to claim 2, wherein the component (B) is an organopolysiloxane comprising a siloxane block represented by the general formula:

—($R^3$HSiO)$_n$— 

wherein, $R^3$ is an alkyl group having 1 to 6 carbon atoms or a phenyl group, and n is a positive number in a range of 3 to 100.

11. The curable silicone composition according to claim 10, wherein the component (D) is a fused silica fine powder.

12. The curable silicone composition according to claim 11, wherein the component (E) is milled glass fibers.

13. The curable silicone composition according to claim 12, further comprising a reaction inhibitor and (G) non-silicone monomer having two or more of polymerizable double bonds, wherein component (G) is divinylbenzene, divinylnaphthalene, allyl methacrylate, triacrylformal, triallylisocyanurate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, polyethylene glycol (PEG#200) di(meth)acrylate with a weight average molecular weight of 200, polyethylene glycol (PEG#400) di(meth)acrylate with a weight average molecular weight of 400, 1,6-hexanediol (meth)acrylate, or trimethylolpropane trimethacrylate.

14. The curable silicone composition according to claim 13, wherein the component (G) is a triallylisocyanurate.

15. The curable silicone composition according to claim 13, further comprising (F) an adhesion promoter.

16. The curable silicone composition according to claim 6, wherein the component (G) is present in an amount of from 30 to 100 parts by mass per 100 parts total mass of the component (A) and the component (B).

17. The curable silicone composition according to claim 8, wherein the component (F) is present in an amount of from 0.1 to 30 parts by pass per 100 parts total mass of the component (A) and the component (B).

18. The curable silicone composition according to claim 1, having a viscosity of from 100 to 1,000,000 mPa·s at 25° C.

19. The cured product according to claim 9, having an average coefficient of linear expansion in the temperature range of 25 to 300° C. of 100 ppm/° C. or lower, as measured in accordance with JIS K 7197-1991.

20. The cured product according to claim 9, having an average coefficient of linear expansion in the temperature range of 25 to 300° C. of 50 ppm/° C. or lower, as measured in accordance with JIS K 7197-1991.

* * * * *